United States Patent [19]

Eslambolchi et al.

[11] Patent Number: 5,438,265
[45] Date of Patent: Aug. 1, 1995

[54] METALLIC CABLE-LOCATING APPARATUS AND METHOD HAVING AN IMAGE CAPTURING MEANS

[75] Inventors: Hossein Eslambolchi, Bedminster, N.J.; Thomas F. Sellers, Conyers, Ga.

[73] Assignee: AT&T Corp., Murray Hill, N.J.

[21] Appl. No.: 125,272

[22] Filed: Sep. 23, 1993

[51] Int. Cl.⁶ ............................................. G01V 3/08
[52] U.S. Cl. ...................... 324/326; 324/67; 348/82
[58] Field of Search ............ 324/220, 326, 127, 66–67; 348/82, 85, 373, 84

[56] References Cited

U.S. PATENT DOCUMENTS

| | | | |
|---|---|---|---|
| 3,832,724 | 8/1974 | Duval | 348/84 |
| 4,143,251 | 3/1979 | Clark | 324/326 |
| 4,344,092 | 8/1982 | Miller | 348/373 |
| 4,372,658 | 2/1983 | O'Connor et al. | 324/220 X |
| 4,412,177 | 10/1983 | Petrini et al. | 324/219 X |
| 4,961,111 | 10/1990 | Herlitz et al. | 348/82 |
| 5,084,764 | 1/1992 | Day | 348/84 |
| 5,089,895 | 2/1992 | Fraker et al. | 348/373 |
| 5,298,987 | 3/1994 | Tomita | 348/82 |

OTHER PUBLICATIONS

EPO Patent Application Publication No. 0534730A1 published Mar. 3, 1993.
EPO Patent Application Publication No. 0388041A3 published Sep. 19, 1990.

*Primary Examiner*—Sandra L. O'Shea
*Assistant Examiner*—Jay M. Patidar
*Attorney, Agent, or Firm*—Robert B. Levy

[57] ABSTRACT

A probe (10) for locating a buried cable (12) includes a casing (16) adapted to be driven into the earth (14). Situated in the casing is an RF receiver (23) for sensing RF energy radiated by the cable to establish the cable's approximate location. The casing also has a viewing window (19) in its lower tip (18) in optical communication with a television camera (30). The camera allows the cable, once its approximate location is established by the RF receiver, to be visually identified.

11 Claims, 2 Drawing Sheets

METALLIC CABLE-LOCATING APPARATUS AND METHOD HAVING AN IMAGE CAPTURING MEANS

TECHNICAL FIELD

This invention relates to an apparatus and method for accurately locating a metallic cable to facilitate its identification.

BACKGROUND OF THE INVENTION

A sizable number of the cables used for telecommunication purposes and for electrical power transmission are buried below ground. Underground burial of cable, while more costly than stringing cable above ground on poles or towers, nevertheless affords certain advantages. Burial of cable below ground is more aesthetically pleasing and reduces the risk of cable damage due to lightning and other elements. On the other hand, a buried cable is far more susceptible to damage by digging due to construction or the like.

To reduce the risk of an underground cable being severed or otherwise becoming damaged as a result of nearby digging, most utilities a have a strict policy requiring that any buried cable in the vicinity of such digging be physically located. To physically locate a buried cable, a utility worker usually must excavate the earth at spaced locations along the cable to expose the cable in order to verify its exact location. Each such excavation is referred to as a "pothole."

The starting location of each such pothole is obtained by first establishing the approximate location of the cable. While a map may be helpful to locate the cable generally, a more exact location is obtained by injecting a Radio Frequency (RF) signal into the cable and then sensing the RF energy that is radiated using an RF receiver for this purpose. The amount of RF energy that is sensed increases as the proximity of the cable to the receiver increases. However, RF sensing by itself does not provide a way of establishing the exact location of the cable since electrical interference from other cables located close to the cable of interest may cause a false measure of RF energy.

Thus, the only accurate way to locate and identify a buried cable is to dig a series of potholes to expose portions of the cable along its length. Depending on the particular utility policy of how far apart such potholes should be, and the extent of the digging that is to occur near the cable, a large number of such potholes may be necessary. As may be appreciated, the process of digging each required pothole is time consuming and extremely expensive.

Thus, there is a need for a technique for locating and identifying a cable, and particularly, a buried cable, with reduced effort and expense.

SUMMARY OF THE INVENTION

Briefly, in accordance with a preferred embodiment of the invention, there is provided a method for locating and identifying a metallic cable, and especially, a metallic cable buried below ground. The method is initiated by applying an RF signal to the metallic cable to cause the cable to radiate RF energy. The approximate location of the cable is then established by sensing the RF energy radiated by the cable. Once the approximate location of the cable has been established, then a member, which is at least partially hollow and has a viewing window therein at one of its ends, is situated such that the viewing window is placed near the cable. In the case where the cable to be located is buffed below ground, the member is sunk into the ground to locate the viewing window adjacent to the cable. The image visible through the viewing window in the member is captured by a television camera to enable observation and identification of the cable. In this way, the cable can be located and identified without the need for potholing. Having visually identified the cable, it may be desirable to bring the tip of the member in physical contact with the cable to enable an RF receiver in the member to detect whether the visually observed cable is indeed the one radiating the RF energy detected previously.

DETAILED DESCRIPTION

Figure 1:
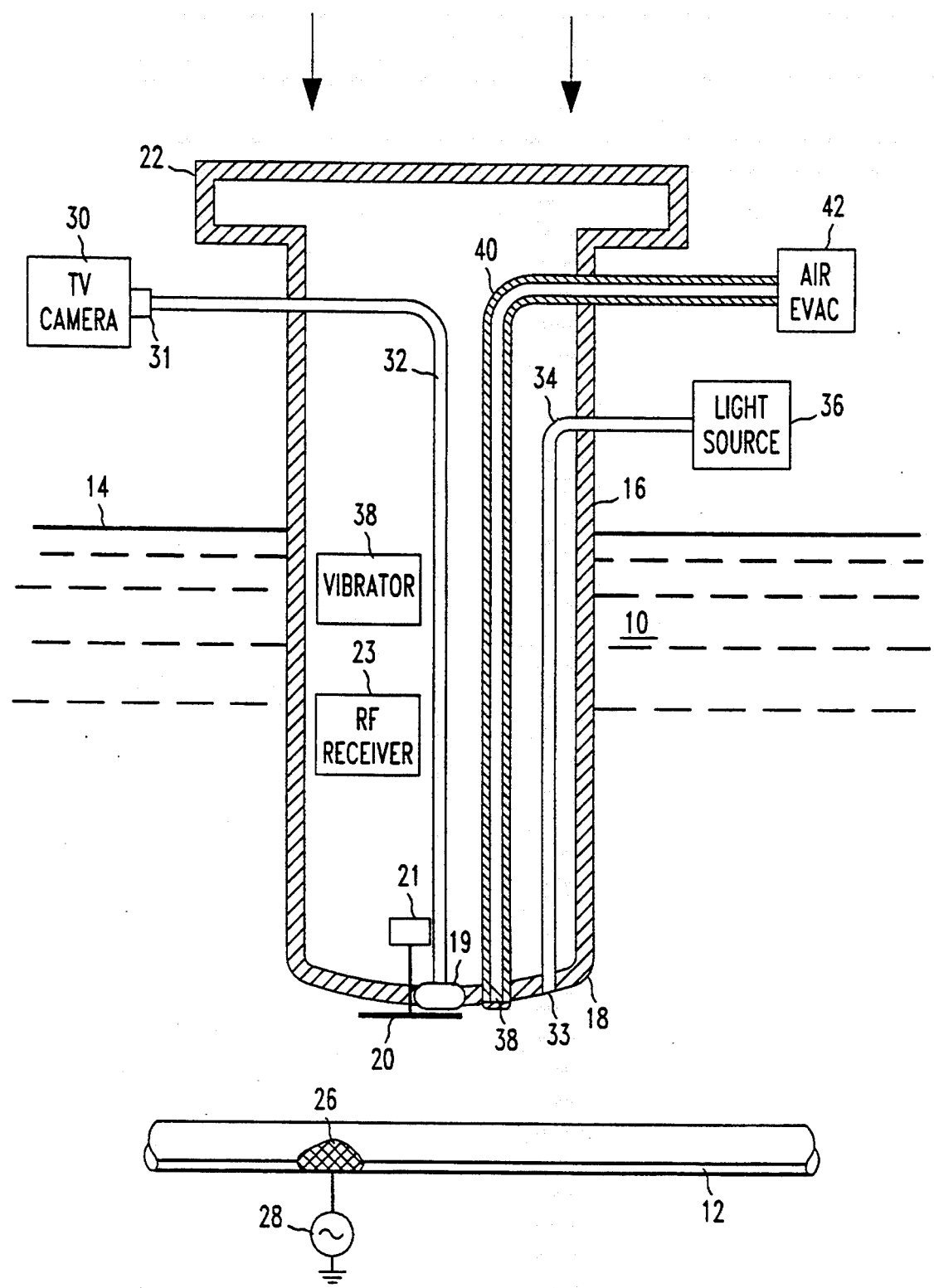
FIG. 1 is a side view, in cross-section, of a first embodiment of a cable probe in accordance with the invention.

FIG. 1 depicts a first embodiment of a probe 10, in accordance with the invention, for locating and identifying a metallic cable 12 buried in the earth 14. The probe 10 is comprised of a casing 16 that is at least partially hollow. In the preferred embodiment, the casing 16 is comprised of a unitary, elongated tube having a closed, generally rounded lower tip 18 that is provided with a viewing window 19 made from substantially clear material, such as PLEXIGLAS resin, capable of withstanding very large stresses. At its upper end, the casing 16 is provided with an integral head 22 that is generally flat to allow the probe 10 to be hammered into the earth 10 upon the application of successive hammer blows against the head. Such hammer blows may be delivered manually or with a pneumatic jack hammer or the like. If the earth 14 were soft and substantially free of rocks, then the probe 10 could be pushed into the earth by hand.

To protect the window 19 from possible damage when the casing 16 is sunk into the earth 14, the window may be shielded by a shutter 20 rotatably journaled to the tip 18 of the casing. A motor 21 is coupled to the shutter 20 for rotating the shutter to expose the window 19 once the casing has been sunk into the earth 14 to a predetermined depth, typically a distance 6"–12" (15–30 cm) from the cable 12.

In practice, the casing 16 is longer than the depth of the cable 12 so that the probe 10 may be sunk into the earth to locate the tip 18 proximate the cable while the head 22 of the casing remains exposed. To enable the probe 10 to be sunk into the earth 14 without significant damage, the casing 16 should be fabricated from a very strong, stress-resistant material such as steel or the like.

To accomplish the task of cable location and identification, the probe 10 includes a Radio Frequency (RF) receiver 23 situated within the casing 16 near the tip 18. The receiver 23, which is of a conventional design, serves to detect RF energy radiated from the cable 12 when the cable is excited by an RF generator 28. As shown in FIG. 1, the RF generator 28 is coupled between circuit ground (typically the earth 14) and a metallic conductor, such as a shield 26, of the cable.

While the RF receiver 23 provides a good indication of the proximity of the cable 12 to the probe 10, the receiver cannot be relied on to precisely locate the cable. Often, the cable 12 is buried adjacent to other metallic cables (not shown) carrying signals that interfere with the RF energy sensed by the RF receiver 23. For this reason, the window 19 is provided to allow the image of the cable 12 to be visible through the tip 18. To observe the image of the cable 12 through the window 19, the probe 10 includes an image-capture device in the form of a television camera 30.

In the preferred embodiment shown in FIG. 1, the television camera 30 is not physically situated in the casing 16. The reason why the television camera 30 is not located in the casing 16 is that the casing is invariably subjected to large stresses and vibration when hammered into the earth. Such stresses and vibration could render the camera 30 inoperative. Instead, the television camera 30 is advantageously situated outside the casing 16 and has its lens 31 coupled via an optical channel 32 (e.g., an optical fiber or the like) to the viewing window 19. In this way, the television camera 30 can capture the image visible through the window 19 while being isolated from the casing 16. Note that in the event that a sufficiently vibration- and stress-insensitive television camera becomes available, such a camera could be situated within the casing 16.

To aid in the capture by the television camera 30 of the image visible through the window 19, the casing tip 18 includes at least one illumination port 33 coupled by an optical fiber 34 to a light source 36, such as a mercury vapor or halogen lamp. Typically, the light source 36 is situated outside the casing 16 for the same reason the television camera 30 is so situated. In the event that a light source that is sufficiently insensitive to vibration and stress becomes available, then the light source 36 could be mounted in the casing 16.

Even though the light source 36 is typically distant from the illumination port 33, light from the light source 36 is thus carried by the fiber 34 to the illumination port to illuminate at least a portion of the field of view of the camera 30. Although only one illumination port 33 has been illustrated, the tip 18 may include as many as three or more such illumination ports, each coupled by a separate optical fiber to the light source 36. Each such illumination port 33 is typically protected by way of a light transmissive lens (not shown) made from PLEXIGLAS resin or the like.

As indicated earlier, the casing 16 is typically sunk into the earth 14 by repeatedly hammering or otherwise applying pressure to the head 22. To aid in the sinking of the casing 16, a power-driven piston vibrator 38 may be provided in the casing to vibrate it. Vibrating the casing 16 as it is being sunk into the earth 14 helps to loosen the adjacent soil, thus reducing the effort required to sink the casing.

Another way to facilitate sinking the casing 16 into the earth 14 is to provide the casing tip 18 with a suction port 38 coupled via a vacuum conduit 40 to an air evacuator 42. Like a conventional vacuum cleaner, the air evacuator draws a partial vacuum through the conduit 40, thus drawing soil up through the conduit to reduce the drag on the casing 16 as it is sunk into the earth 14.

The operation of the probe 10 will now be described. To locate the cable 12 with the probe 10, first, the approximate location of the cable is established by sensing the RF energy radiated by the cable. Once the proximate location of the cable 12 is established, then the casing 16 of the probe 10 is sunk into the earth in the vicinity of the cable 12. As the casing 16 is being sunk, the RF energy sensed by the receiver 23 is monitored and the position of the casing is adjusted so that the tip 18 of the casing is directed towards the cable 12.

Once the casing 16 has been sunk such that the tip 18 is approximately 6"-12" (15-30 cm) from the known depth of the cable 12, then the light source 36 is rendered operative. Thereafter, the shutter 20 is opened to allow the television camera 30 to capture the image visible through the window 19. Assuming that the RF sensing has been effective to situate the tip 18 reasonably close to the cable 12, then the cable should be visible through the window 19, and thus visible to the television camera 30, thereby allowing the cable to be visually identified. Once the cable 12 has been visually identified, then the casing 16 can be sunk further into the ground to bring the tip 18 in gentle contact with the cable 12. If the cable 12 is indeed the cable of interest, the RF receiver 23 should register a maximum sensed RF energy upon contact of the tip 18 with the cable.

Figure 2:
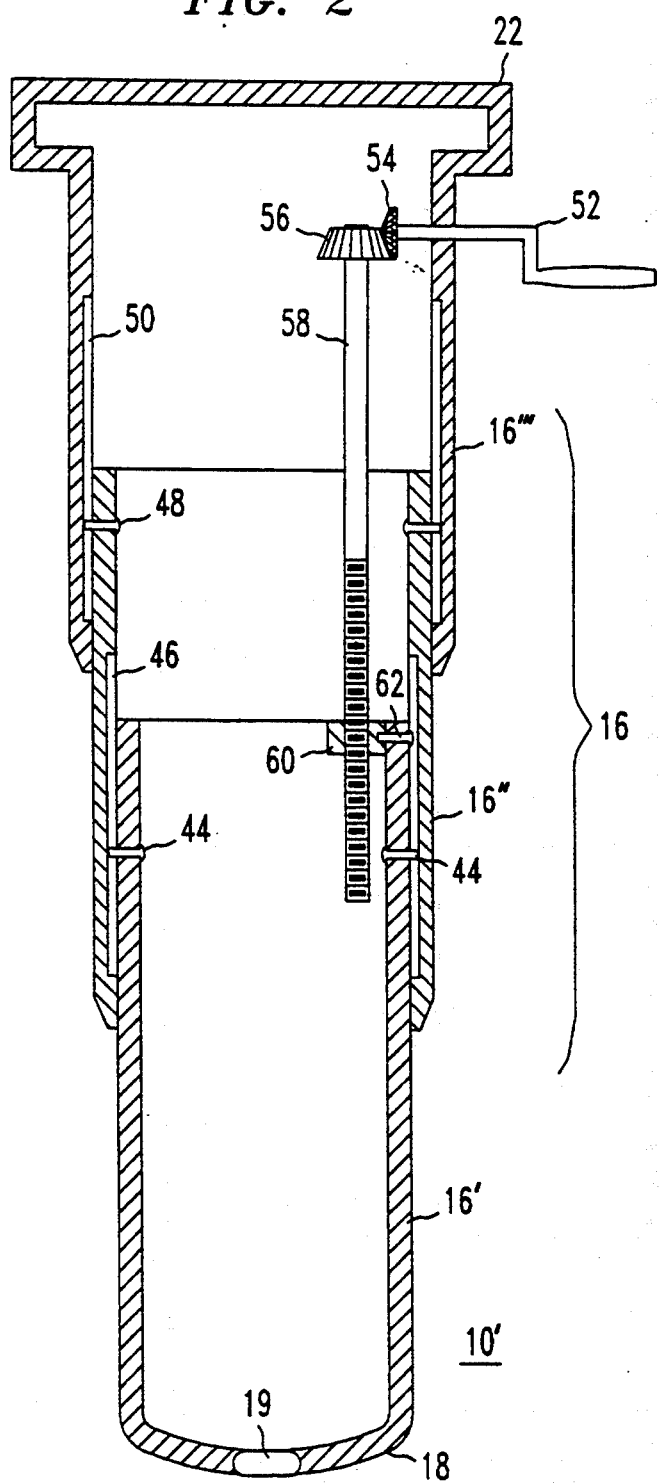
FIG. 2 is a side view, in cross-section, of a second preferred embodiment of the cable probe in accordance with the invention.

Referring to FIG. 2, there is shown a first alternate preferred embodiment 10' of the probe of the invention. The probe 10' differs from the probe 10 of FIG. 1 in the construction of the casing 16. Otherwise, the probes 10 and 10' are identical. Therefore, the elements within the probe 10' of FIG. 2 common to the probe 10 of FIG. 1 have been omitted from FIG. 2.

As seen in FIG. 2, the casing 16 of the probe 10' is not unitary, but rather, comprises three separate, tubular elements 16', 16" and 16''' telescoped inside each other. The tubular element 16', the narrowest of the elements, is provided with a closed, rounded bottom, which forms a tip 18 just like the tip 18 of FIG. 1. As with the casing tip 18 of FIG. 1, the tip 18 of FIG. 2 has a viewing window 19. The tubular element 16''', having the largest diameter, is provided with a flat head 22, just like the casing 16 of FIG. 1

The element 16' of FIG. 2 is slidably secured within the tubular element 16", typically by way of a set of fasteners 44. Each fastener 44 is threaded through the wall of the tubular element 16" perpendicular to its major axis so as to extend part way into a channel 46 cut into the inside bore of the tubular element 16" parallel to its major axis. In this way, the tubular element 16' can move axially relative to the tubular element 16", the length of such movement being determined by the length of the channels 46. The tubular element 16" is slidably secured within the tubular element 16''' via a set of fasteners 48, each threaded through the tubular element 16" to extend partially into a separate channel 50 longitudinally cut into the bore of the element 16'''.

To telescope the tubular elements 16' and 16" into and out from the elements 16" and 16''', respectively, the probe 10' includes a crank 52 having a first end rotatably journaled through the tubular element 16''' perpendicular to its major axis. Integral with the end of the crank 52 situated inside the tubular element 16''' is a worm gear 54 in meshing engagement with a worm gear 56 at the top of a threaded shaft 58 oriented parallel to the major axes of the tubular elements 16', 16" and 16'''. The shaft 58 is threaded through a block 60 attached to the interior bore of the tubular element 16' by way of one or more threaded fasteners 62 (only one such fastener shown in FIG. 2).

By cranking the handle 52 in a first direction, the shaft 58 is threaded out of the block 60, thus effectively displacing the tubular element 16' out from the element 16″ and subsequently displacing the element 16″ out from the element 16‴. Conversely, when the crank 52 is rotated in the opposite direction, the shaft 58 is threaded into the block 60, causing the tubular element 16′ to be telescoped into the element 16″ and the element 16″ to be telescoped into the element 16‴.

The probe 10′ operates in exactly the same way as the probe 10 of FIG. 1 except that the probe 10′ is not hammered all of the way into the ground. Rather, the probe 10′ is partially hammered or otherwise driven into the ground and then the tubular elements 16′ and 16″ are telescoped out from the elements 16″ and 16‴, respectively, by cranking the crank 52.

Figure 3:
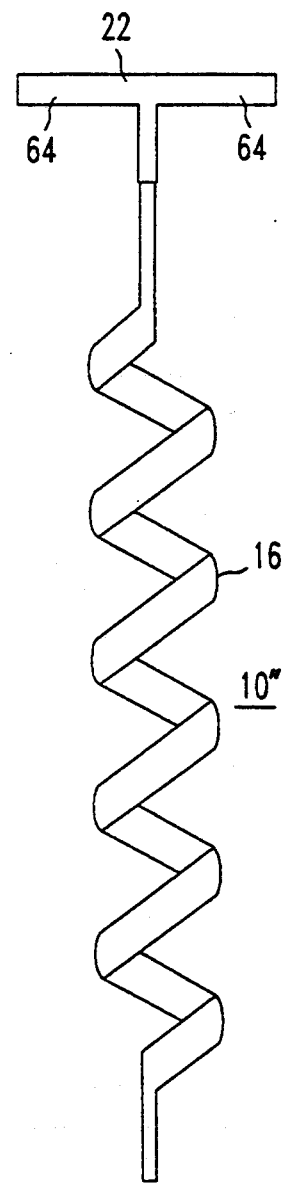
FIG. 3 is a side view of a third embodiment of the cable probe in accordance with of the invention.

Referring now to FIG. 3, there is shown a third preferred embodiment 10″ of the cable locating probe of the invention. The probe 10″ of FIG. 3, like the probe 10 of FIG. 1, has a unitary casing 16. However, the casing 16 of the probe 10″ of FIG. 3 is not straight, but rather, has a helix configuration to allow the probe 10″ to bore into the earth as the probe is rotated. To facilitate sinking the probe 10″ into the earth 10 in this manner, the head 22 of the probe is provided with a pair of handles 64—64 that extend outwardly perpendicular to the major axis of the probe casing 16. In all other respects, the probe 10″ is identical to the probe 10′ of FIG. 1 and operates in the same fashion to locate and facilitate the identification of the cable 12 (see FIG. 1).

The foregoing describes a probe for accurately locating and visually identifying a cable, especially a buried cable. It is to be understood that the above-described embodiments are merely illustrative of the principles of the invention. Various modifications and changes may be made thereto by those skilled in the art which will embody the principles of the invention and fall within the spirit and scope thereof. For example, although the probe of the invention has been described with respect to buried cables, it also could be used to locate cables situated above ground but whose accessibility is limited.

We claim:

1. A method for locating and identifying a metallic cable comprising the steps of:
    (a) applying a Radio Frequency (RF) signal to the metallic cable so that the metallic cable radiates RF energy;
    (b) establishing the approximate location of the cable by sensing the RF energy radiated by the cable via an RF sensing device;
    (c) situating a cable-locating member, having a viewing window in one end thereof, proximate the cable so that the viewing window in the member is approximately contiguous to the cable; and
    (d) capturing an image of the cable, visible through the viewing window in the member, to observe and identify the cable.

2. The method according to claim 1 further including the steps of:
    (a) situating the member contiguous with the cable; and
    (b) sensing the RF energy radiated from the cable once the member is contiguous therewith.

3. The method according to claim 1 wherein the cable is buried below ground and wherein the cable-locating member is repeatedly hammered to sink the member into the ground to situate the viewing window so it touches the cable.

4. The method according to claim 1 wherein the cable is buried below ground and wherein the member has a helix configuration and is twisted into the ground to situate the viewing window proximate the cable.

5. A probe for locating and identifying a cable on which an RF signal is superimposed comprising:
    a generally cylindrical, at least partially hollow, cable-locating member having a closed-rounded tip at one end, for placement proximate the cable, and a head at another end;
    a viewing window situated in the tip of the member so as to touch the cable when the member is placed proximate thereto;
    a Radio Frequency (RF) receiver situated within the cable-locating member for sensing RF energy radiated by the cable;
    an illumination window situated in the tip of the member;
    a viewing means for capturing an image visible through the viewing window; and
    a light source for directing illumination out through the illumination window to illuminate the image visible through the viewing window.

6. The probe according to claim 5 wherein the viewing means comprises a television camera situated outside of the member and a length of optical fiber in communication with the viewing window and extending beyond the member for optically coupling the television camera to the viewing window.

7. The probe according to claim 5 further including a piston vibrator situated in the member for imparting a vibration thereto to facilitate sinking of the member into the earth.

8. The probe according to claim 5 further including:
    a suction port situated in the tip of the member;
    an air evacuator situated outside the member; and
    a vacuum conduit coupling the suction port to the air evacuator to enable earth, proximate the suction port, to be evacuated therethrough.

9. The probe according to claim 5 wherein the member comprises a single unitary structure.

10. The probe according to claim 5 wherein the member has a helix structure.

11. The probe according to claim 5 wherein the member comprises a plurality of discrete tubular elements telescoped within one another and further including means for telescoping the elements to and from each other.

* * * * *